(12) United States Patent
Graham et al.

(10) Patent No.: US 8,996,025 B2
(45) Date of Patent: Mar. 31, 2015

(54) COMMUNICATION PARAMETER SELECTION FOR SMALL CELL ACCESS POINTS

(71) Applicant: Cisco Technology, Inc., San Jose, CA (US)

(72) Inventors: Mickael Graham, Bellevue Hill (AU); Anton Okmyanskiy, Vancouver (CA); Jeffrey Antoline, Roswell, GA (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 13/777,136

(22) Filed: Feb. 26, 2013

(65) Prior Publication Data

US 2014/0243004 A1 Aug. 28, 2014

(51) Int. Cl.
*H04W 72/00* (2009.01)
*H04W 16/00* (2009.01)
*H04W 24/02* (2009.01)

(52) U.S. Cl.
CPC .............. *H04W 16/00* (2013.01); *H04W 24/02* (2013.01)
USPC ........ 455/452.1; 455/436; 455/425; 455/442; 370/254; 370/331

(58) Field of Classification Search
USPC ........ 370/254, 331; 455/436, 425, 442, 452.1
See application file for complete search history.

(56) References Cited

U.S. PATENT DOCUMENTS

| 8,121,598 | B2 | 2/2012 | Hamel et al. | |
| 8,175,005 | B2* | 5/2012 | Okmyanskiy et al. | 370/254 |
| 2008/0287119 | A1* | 11/2008 | Yasuda | 455/425 |
| 2009/0290555 | A1* | 11/2009 | Alpert et al. | 370/331 |
| 2011/0014920 | A1* | 1/2011 | Nylander et al. | 455/442 |
| 2011/0019582 | A1* | 1/2011 | Okmyanskiy et al. | 370/254 |
| 2012/0088482 | A1 | 4/2012 | Pazhyannur et al. | |
| 2013/0079007 | A1* | 3/2013 | Nagaraja et al. | 455/436 |

* cited by examiner

*Primary Examiner* — David Q Nguyen
(74) *Attorney, Agent, or Firm* — Edell, Shapiro & Finnan, LLC

(57) ABSTRACT

Communication parameter selection techniques are presented to reduce interference in small cells of wireless networks. A list of neighboring radio access points with respect to a particular radio access point in a wireless network is obtained. The list includes a unique identifier for each neighboring radio access point. A set of candidate communications parameters are obtained for use in the wireless network by the particular radio access point. A prediction is made of candidate communications parameters in the set of candidate communications parameters which can be used by the neighboring radio access points. The communication parameters in the set of candidate communication parameters which are available for use by the particular access point are determined based on the predicted set of communications parameters. A communication parameter is selected for use by the particular radio access point based on the communication parameters determined to be available for use.

33 Claims, 7 Drawing Sheets

COMMUNICATION PARAMETER SELECTION FOR SMALL CELL ACCESS POINTS

TECHNICAL FIELD

The present disclosure relates to communication parameter selection to reduce interference in small cell wireless networks.

BACKGROUND

In wide area wireless communication networks, relatively high power base station devices are provided to serve wireless client devices or user devices. Each base station device is capable of serving wireless user devices in a coverage area that is primarily determined by the power of the signal it can transmit. Wireless service to user devices located within large buildings becomes degraded because the user device has difficulty receiving a signal from the base station, even if the building is well within the coverage area of the base station.

To augment the coverage of the wireless network, wireless transceiver devices with relatively small coverage areas (and serving capacities) are deployed. Depending on their coverage area and serving capacities, these wireless transceiver devices are referred to as "femto" cells or "pico" cells, or more generally, small cell access point devices. For simplicity and generality, the term radio access point (RAP) device is used herein to refer to a wireless transceiver device that is configured to serve wireless user devices over relatively small coverage areas and with generally less capacity as compared to a macro base station that is configured to serve a relatively large coverage area ("macro cell") and consequently many more client devices. The RAP devices may be deployed inside or near buildings to serve client devices where signals from a macro base station are too weak.

The client device and RAP devices use a frequency and primary scrambling code combination. The frequency identifies the radio frequency channel in the wireless spectrum that is used for communication with the client device. The primary scrambling code is used to distinguish one cell (macro cell or RAP cell) from another that uses the same frequency. In certain scenarios, it is possible for two RAPs that are not within radio range of each other, to use the same primary scrambling code. Although the RAPs are not within radio range of each other, both RAPs may be visible to the client device. When this occurs, the client device can receive signals from both RAPs that interfere with each other. The interference may result in garbled reception or dropped service for the client device.

DESCRIPTION OF EXAMPLE EMBODIMENTS

Overview

Techniques are presented herein to reduce interference in small cells of wireless networks. A list of neighboring radio access points with respect to a particular radio access point in a wireless network is obtained. The list includes a unique identifier for each neighboring radio access point. A set of candidate communication parameters is obtained for use in the wireless network by the particular radio access point. A prediction is made of candidate communication parameters in the set of candidate communications parameters which can be used by the neighboring radio access points. A result of the prediction is a predicted set of communications parameters. The communication parameters in the set of candidate communication parameters which are available for use by the particular access point are determined based on the predicted set of communications parameters. A communication parameter is selected for use by the particular radio access point based on the communication parameters determined to be available for use.

Example Embodiments

Figure 1:
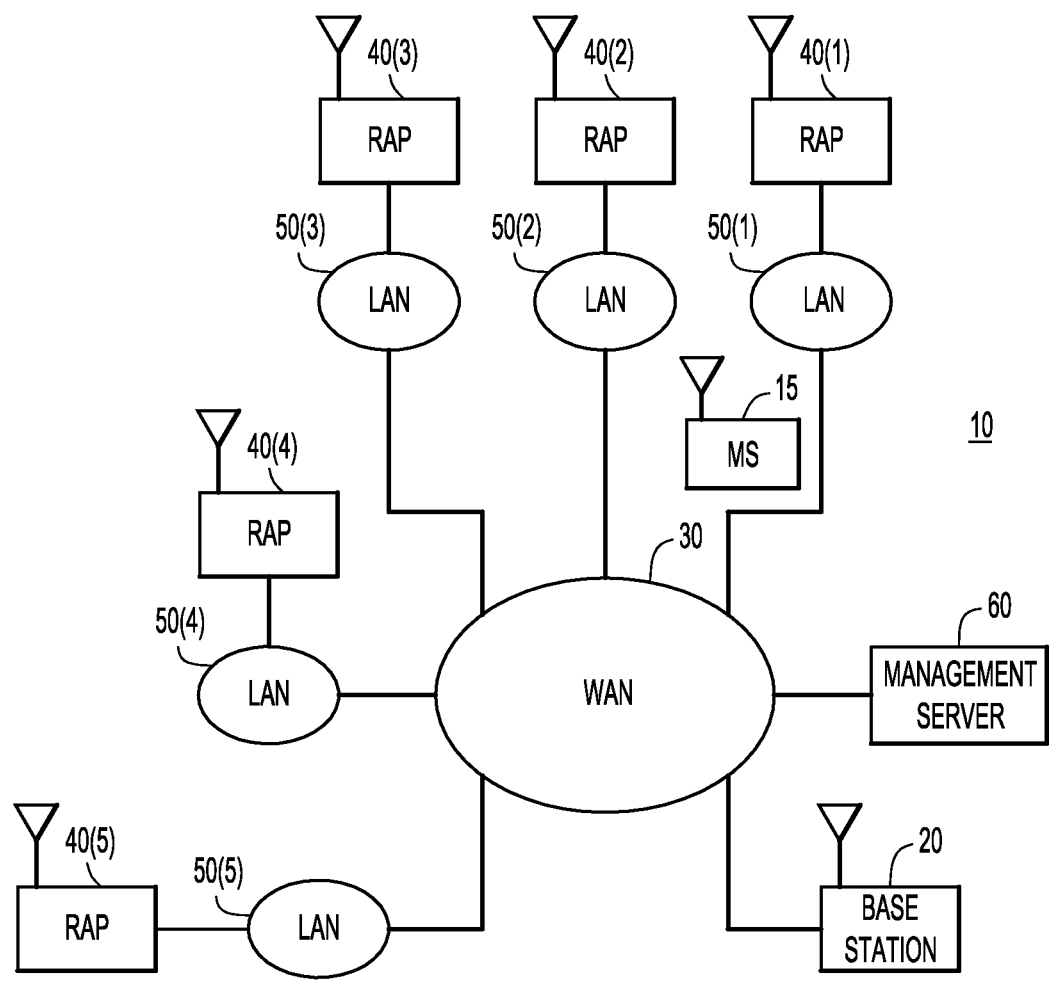
FIG. 1 is a block diagram that illustrates a wireless communication network and related infrastructure elements configured to perform a communication parameter selection process.

Referring first to FIG. 1, a block diagram is shown of a wireless communication network 10 including several infrastructure elements that are configured to manage operations for the network 10 and to facilitate certain functions described herein. The network 10 is a wide area wireless communication network, such as one that is built according to the "3G" or "4G" wireless communication standard specifications. The network 10 is designed to provide a variety of voice and data services to wireless client devices, e.g., mobile phones, mobile computing devices, etc. An example of a wireless client device or mobile station (MS) is shown at 15. Wireless client devices are also known as user equipment (UE) in 3G and 4G terminology. The terms wireless client, MS and User Equipment (UE) are used interchangeably here.

In order to serve wireless client devices, there are long range or "macro" cell base stations that are configured to serve relatively large coverage areas (measured in miles or km). An example of a macro cell base station is shown at 20. Only one macro cell base station 20 is shown in FIG. 1 for simplicity but it should be understood that there are numerous such devices in a wireless network deployment, each of which connects to a macro radio network controller. The macro radio network controller (not shown) interfaces voice calls to a public telephone network (not shown) and interfaces voice or data sessions to a wide area network (WAN), e.g., the Internet, shown at reference numeral 30.

Recently, efforts have been made to improve the delivery of wireless services to client devices when they are out of range of a macro cell tower because they are located within a building for example. Wireless service to client devices located within large buildings becomes degraded because the client device has difficulty receiving a signal from the base station, even if the building is well within the coverage area of the base station. Accordingly, wireless transceiver devices with relatively small coverage areas (and serving capacities) are deployed. Depending on their coverage area and serving capacities, these wireless transceiver devices are referred to as "femto" cell or "pico" cell access point devices. For simplicity and generality, the term radio access point (RAP) device is meant to refer to a wireless transceiver device that is configured to serve wireless client devices over relatively small coverage areas and with generally less capacity as compared to a macro cell tower. Another term for a RAP device is a micro base station. Examples of RAP devices are shown at 40(1)-40(5). In 3G and 4G terminology, these RAP devices are referred to Home Node B (HNB) devices. Again, the RAP devices are configured to provide the same type of wireless services to client devices when the wireless client devices are out of range of a macro cell tower. The relatively small coverage area of a RAP device is measured in terms of feet or meters.

The RAP devices may be deployed within or near a building (e.g., small or large business enterprise or a home) and are connected to a wired local area network (LAN). For example, RAP devices 40(1)-40(5) are connected to LANs 50(1)-50 (5), respectively. There may be several more RAP devices, but for simplicity they are not shown in FIG. 1. Each of the LANs 50 is connected to a wide area network, e.g., the Internet shown at 30. The number of LANs 50 need not correspond to the number of RAPs 40, e.g., one or two LANs may service two or more of the RAPs 40.

There are additional infrastructure elements not shown in FIG. 1 to assist in managing the network 10. For example, there are one or more access controllers (also known as gateway devices) and macro radio network controllers. A management server 60 is also provided that serves as a more centralized control point to provision RAP devices in the network 10 and also to provide a user interface point for a network administrator to provide configuration commands/data as well as to view the status of the network 10. The management server 60 may communicate with the appropriate access controller which in turn communicates with the appropriate enterprise controller (also not shown for simplicity) for the one or more RAP devices to which the command is to be sent.

In network 10, 3G/4G small cells (RAPs) are mini cell towers that range from residential femtocells supporting 4 users to larger metrocells supporting up to 64 users. The RAPs operate over licensed radio spectrum and are deployed to increase coverage and capacity of the macro network, as briefly described above. Consistent with the trend towards higher data throughput, the radius of cell coverage areas in urban areas is being reduced and RAPs are being deployed in ever increasing numbers. The increasing quantities and density of RAPs introduces new challenges for managing their communication parameters which use Self Organizing Network (SON) concepts.

The parameter selection techniques described herein can be used to select a variety of communication parameters, e.g., Primary Scrambling Code (PSC), Physical Channel Identifier (PCI), a Universal Mobile Telecommunications System (UMTS) Terrestrial Radio Access (UTRA) Absolute Radio Frequency Channel Number (UARFCN), Long Term Evolution (e) eUARFCN, Absolute Radio Frequency Channel Number (ARFCN), a Location Area Code (LAC), and a Routing Area Code (RAC). For ease of description, specific examples are described with respect to PSC selection.

Selection of an optimal PSC is important to the quality of service because it ensures that overlapping cells do not interfere with each other and do not create ambiguity for mobile station hand-in. The quantity of candidate PSCs within the candidate list in a given area is typically small, e.g., approximately six, because of constraints on the neighbor list of the macro base station. To select a PSC from the candidate list, conventional techniques involve the RAP performing a radio environment measurement (REM) scan. The scan detects the PSCs already in use by neighboring cells. The RAP then eliminates all detected PSCs from its candidate list and selects one of the remaining candidates. While REM is effective under certain circumstances, it does not work for neighboring cells that may be hidden, e.g., cells that may be within a detection range or not, but are not detected during a REM scan. The undetected neighboring RAPs may still cause network interference.

A hidden neighbor RAP is one neighbor that a RAP cannot detect from its REM scan. The coverage areas of two RAPs can overlap such that the MS 15 can receive signals from both RAPs, yet the coverage of each RAP may not reach to the neighboring RAP for REM scan detection. Without knowledge of hidden neighbors, the RAPs cannot effectively select an optimal PSC. The number of hidden neighbors can be large because RAPs also tend to be deployed in dense clusters when in areas of poor macro coverage. Due to construction or other environmental factors that can influence radio frequency (RF) environments, neighboring RAPs may be redirected (physically moved) from a detectable RF environment to an RF environment in which a neighboring RAP is not detectable. In many cases, such as for RAPs deployed for residential/consumer use, the locations of RAPs are not controlled and RF "leakage" outside a particular home is very common and difficult to predict. Furthermore, the REM-based techniques do not provide for convergence of selected PSC values to an optimal state. Further still, the RAPs may transmit at different power levels, thereby varying RF interference potential. For example, as shown in FIG. 1, while RAP 40(1) can scan and detect signals from RAP (2), it may not be possible for RAP 40(2) to scan and detect signals from RAP 40(1), as will be further described hereinafter.

A scrambling code is a code used to distinguish one cell (macro cell or RAP cell) from another, as described above. The scrambling code is defined by a code comprising a fixed number of bits. All of the available codes are divided into groups, each group comprising a so-called primary scrambling code and a plurality of secondary scrambling codes. A macro cell base station or RAP device uses a primary scrambling code for downlink transmissions to be heard by all client devices, i.e., UEs, in the cell, e.g., to unscramble common control channels. There are also a fixed number of channel frequencies available to a macro base station or RAP device. Accordingly, techniques are needed to address the situation where RAPs of different cells may use the same PSCs that can be "received" by one or more subscriber devices, thereby potentially creating confusion to the UE. In this regard, traditional PSC selection mechanisms allow the RAP to autonomously select a random PSC or a "first available" PSC from a PSC list, but without regard to a PSC that a neighboring hidden RAP may have already selected.

The techniques presented herein eliminate or mitigate interference issues that arise by way of traditional PSC selection. For example, an HNB that provides wireless services in a home is managed by an HNB management system (HMS) that may avail itself to network information, e.g., geographical locations of RAPs. As explained above, the term "HNB" is used in 3G and 4G parlance to refer to femtocell sizes, that is, any small cell whether in a home, home office, building, or any other "small" service area that can not be fully serviced by a macrocell base station.

Using traditional PSC selection techniques, several of the RAPs 40(1)-40(5) may randomly choose the same PSC, thereby creating a PSC conflict for certain UEs. Mathematical modeling indicates that there is a 77% probability that a PSC conflict will arise in current high density RAP deployments.

For purposes of a further description of the parameter selection challenges, the following terminology is defined. A source RAP is a RAP for which a small cell radius is defined, e.g., 50 or 100 meters (M) radius, an in-range RAP is a RAP that is physically located within the radius of the source RAP 40(1), and a stand-alone RAP is an RAP outside the radius of the source RAP. Due to any given RF propagation environment, source RAPs may or may not be able to detect in-range RAPs, and may or may not be able to detect stand-alone and out of range RAPs. A cluster may be defined as a source RAP and any in-range RAPs with respect to the source RAP.

FIG. 1 shows RAPs 40(1)-40(3) located relatively close to each other, all of which may be considered as part of a cluster. RAP 40(1) has a given radius within which RAP 40(2) is located. MS 15 may also be located within that radius. RAP 40(1) may or may not be able to detect in-radius RAP 40(2), or RAPs 40(3)-40(5) due to the RF environment. Furthermore, MS 15 may be able to receive signals from out-of-range RAPs, such as RAPs 40(3)-40(5). In such an environment, traditional PSC selection techniques will result in a higher probability of interference than may occur when PSC selection is made by way of the techniques presented herein. The selection of various parameters according to the techniques presented herein may be made by management server 60, each RAP 40(1)-40(5) autonomously, or another network device coupled to the RAPs 40(1)-40(5) via WAN 30.

Figure 2:
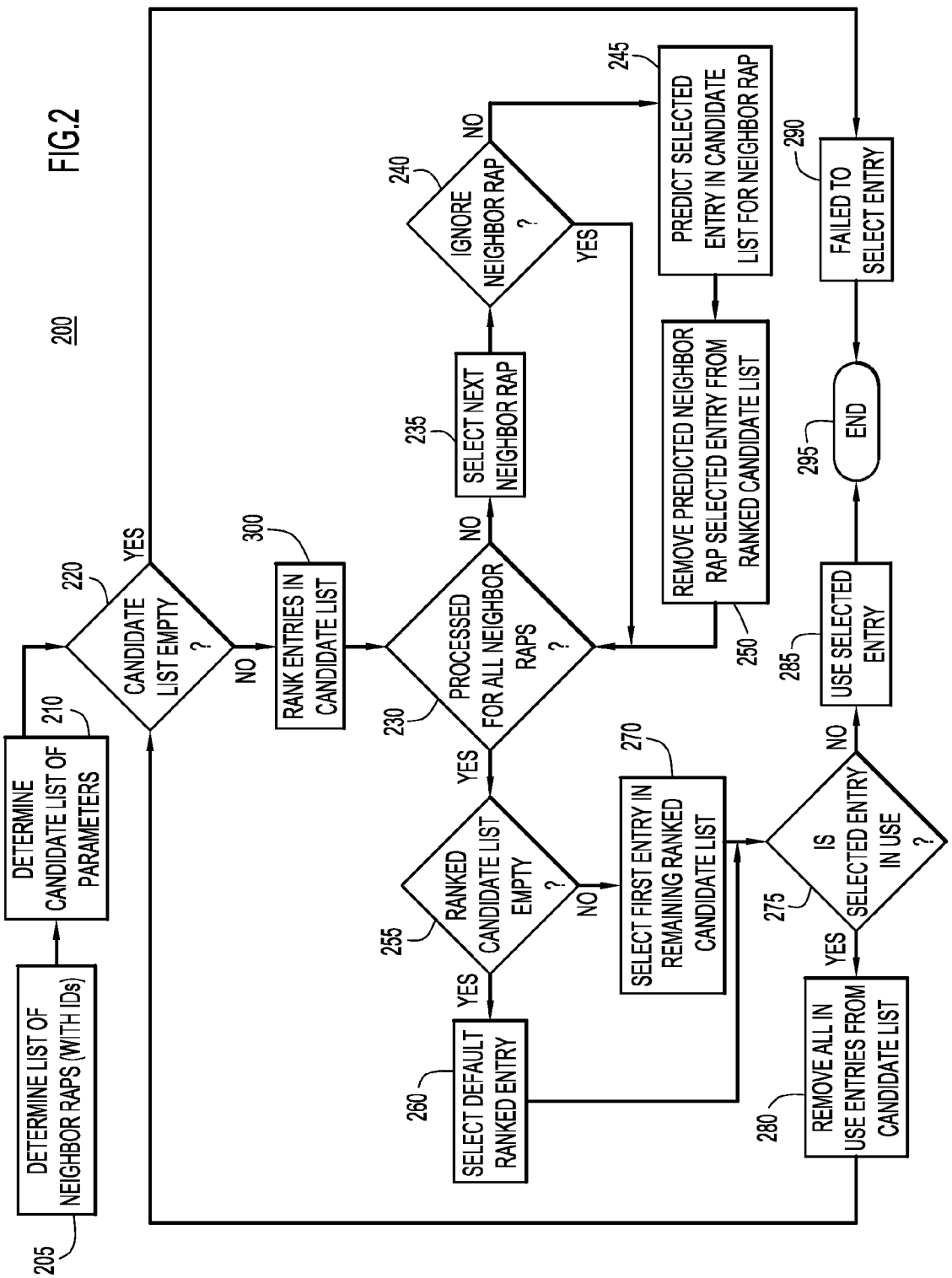
FIG. 2 is a flow chart depicting a process for selecting a radio access point communication parameter.
Figure 3:
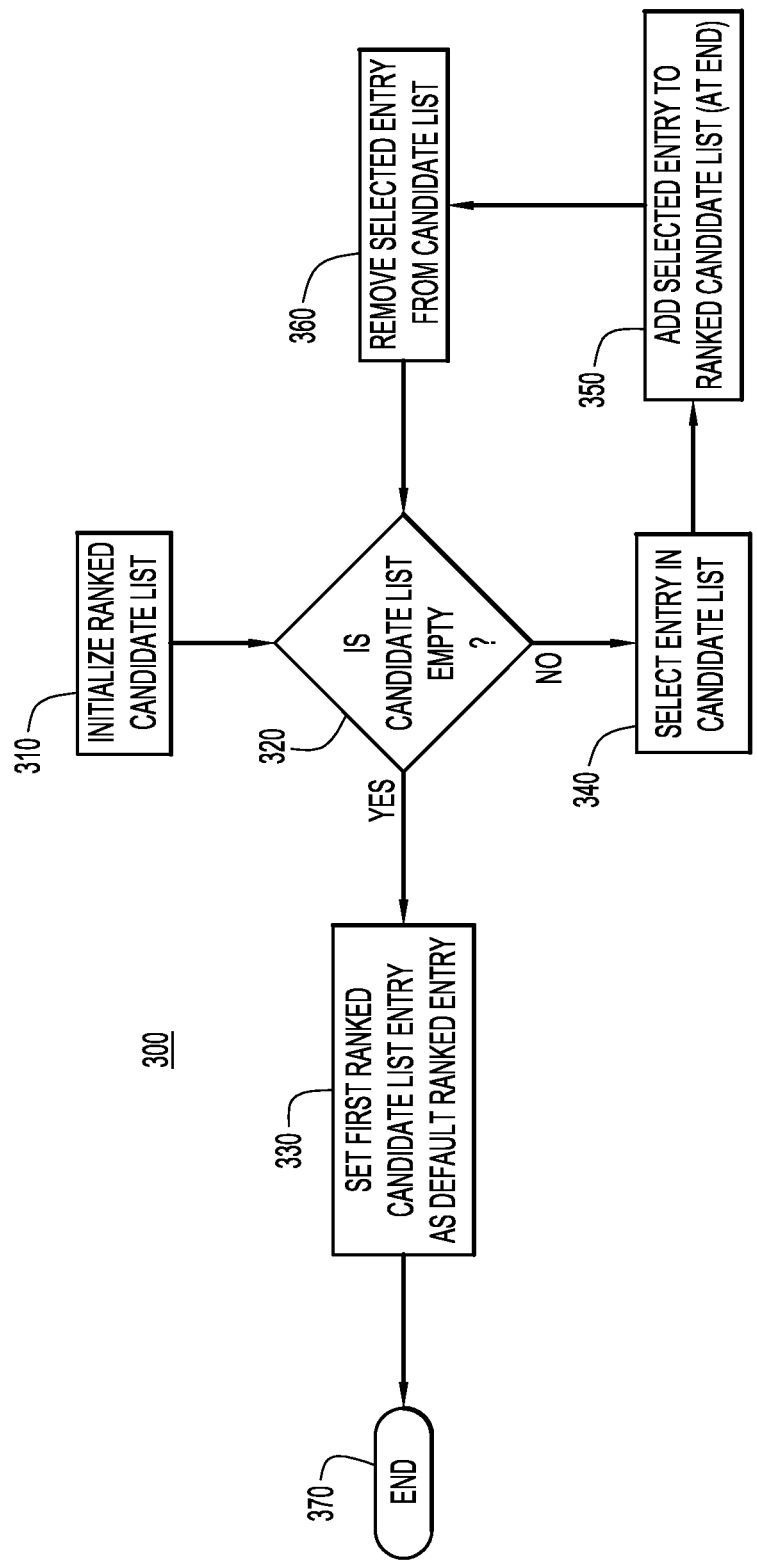
FIG. 3 is a flow chart depicting a process for ranking a candidate parameter selection list used in the process of FIG. 2.
Figure 4:
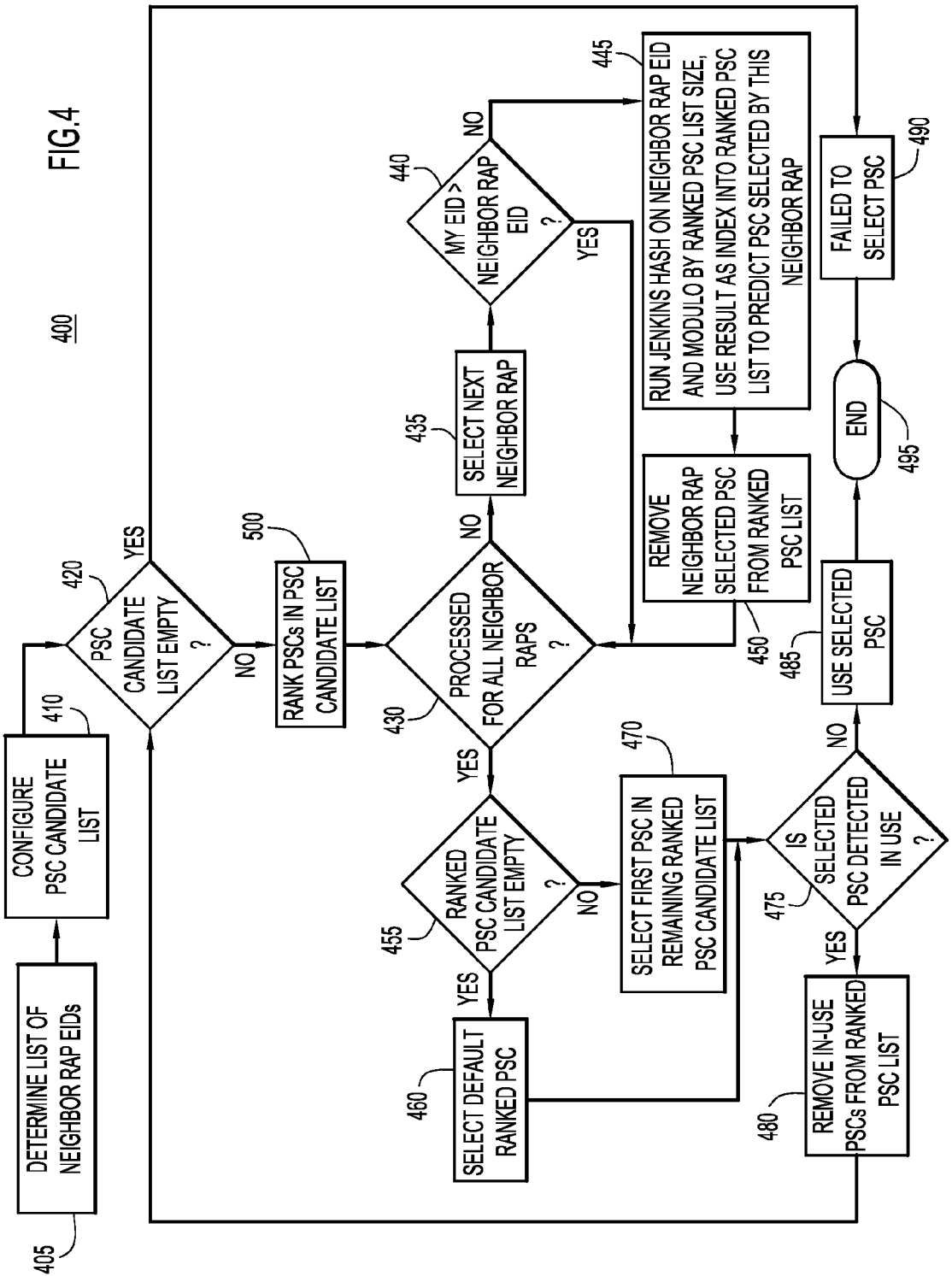
FIG. 4 is a flow chart depicting a process for selecting a primary scrambling code (PSC) for a radio access point.
Figure 5:
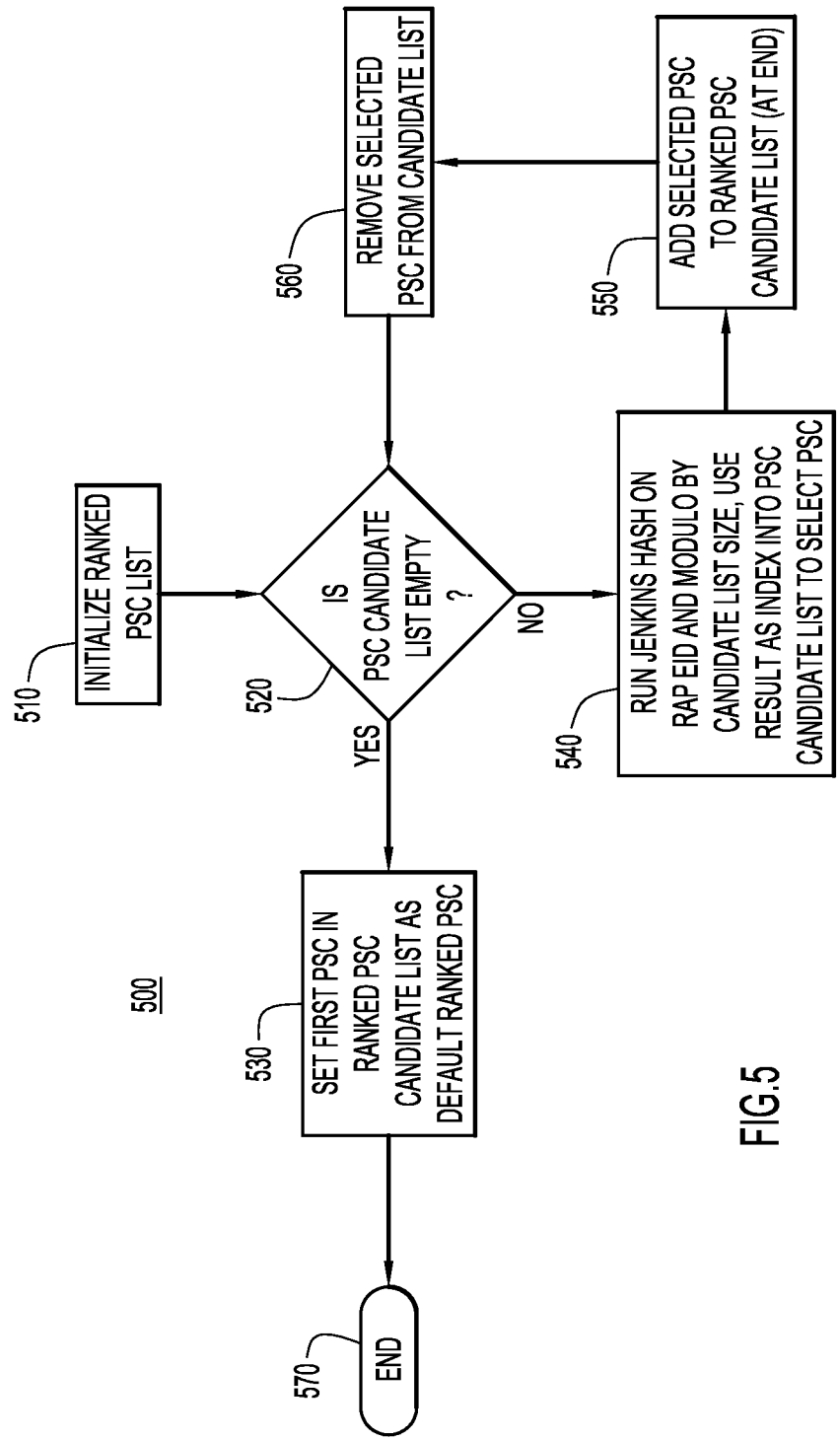
FIG. 5 is a flow chart depicting a process for ranking a candidate PSC list used in the process of FIG. 4.
Figure 6:
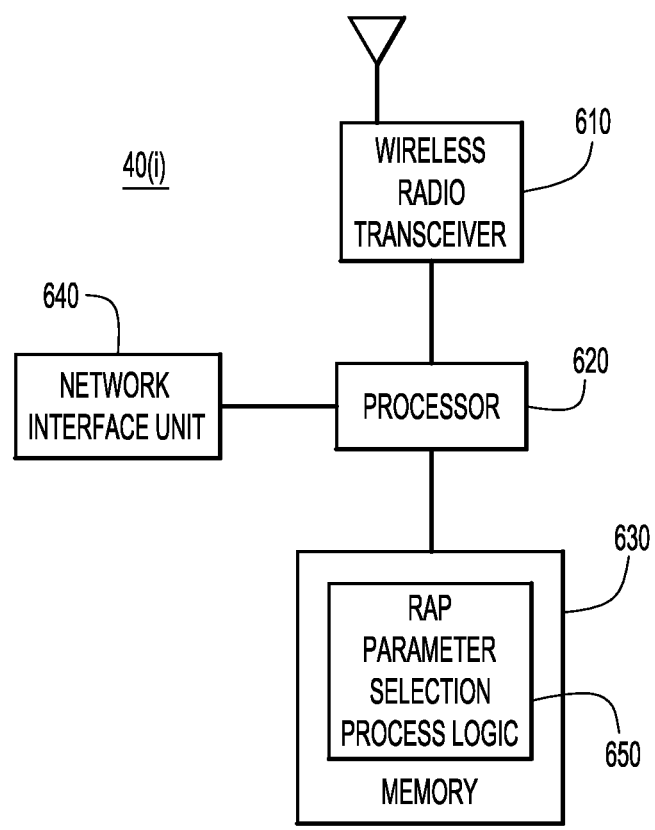
FIG. 6 is an example of a block diagram of a radio access point configured to select a communication parameter according to the techniques presented herein.
Figure 7:
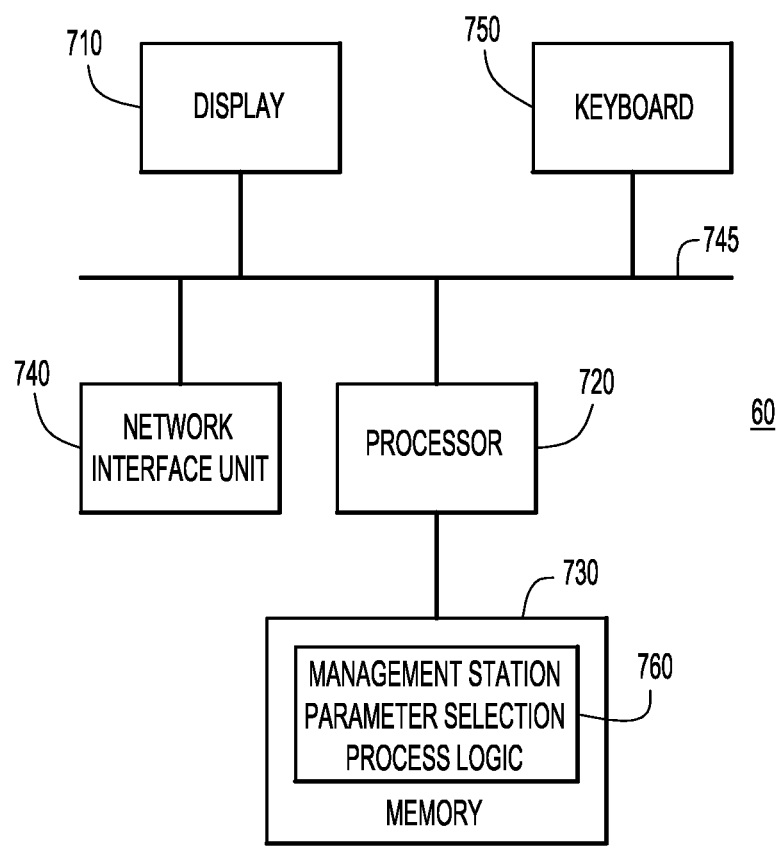
FIG. 7 is an example of a block diagram of a management device configured to select a communication parameter for a radio access point according to the techniques presented herein.

Reference is made to the remaining figures for a further description of the parameter selection techniques. FIGS. 2 and 3 are flow charts for a communication parameter selection process. FIGS. 4 and 5 are flow charts specific to a PSC selection process. FIGS. 6 and 7 are block diagrams for a RAP and a management server, respectively, each configured to perform (or participate in) the parameter selection techniques.

Reference is now made to FIGS. 2 and 3 for a description of communication parameter selection process 200. Reference is also made to FIG. 1 during the description of these figures. The communication parameter selection process 200 may be performed all or in part by a RAP, e.g., RAPs 40(1)-40(5), base station 20, management server 60, or some other LAN or WAN attached device, and the selection result of the process 200 is communicated in an appropriate message to a particular RAP for its use. Each RAP has a unique identifier (ID) that is used for management and other purposes. At 205, a list of neighbor RAPs is determined for each RAP. If the parameter selection process 200 is being performed in the RAP, then the list is provisioned into the RAP by the management server 60.

The list of neighbor RAPs for a given/particular RAP may be determined in various ways, e.g., using geographic coordinates such as Global Positioning System (GPS) latitude and longitude coordinates, configured by an installer or network operator, or otherwise discovered using mechanisms available in the WAN 30 and/or LANs 50. In many deployments, the locations of RAPs are determined at the time of installation and location data is stored in a central facility, e.g., the management server 60, for access as needed. The ID assigned to each RAP may be a unique equipment identifier (EID) such as a factory Media Access Control (MAC) address or an ID that is unique to the wireless network for the purpose of allowing one RAP to distinguish between RAPs within any given area.

After the list of neighbor RAPs is determined at 205, a list of candidate communication parameters (of a particular type) that may be used by a particular RAP is determined at 210. Communication parameters may include RACs, LACs, UMTS channel numbers and the like, as described above. The candidate list may be a subset of all available parameters of a given type or class appropriate for a RAP, and may be based on network design, topology, frequency plan, etc. If the process 200 is performed in a RAP, then the list of candidate communication parameters is provisioned into the particular RAP by the management server 60 based on location data or installation location, or it is provisioned into the particular RAP by an installer during installation. Thus, the candidate list contains a plurality of PSCs from which the particular RAP may select, or a plurality of RACs from which the particular RAP may select, or a plurality of LACs from which the particular RAP may select, etc. The object of the process 200 is to determine which of the entries in the list of candidate communication parameters a particular RAP should select so as to minimize conflicts with its neighboring RAPs.

At 220, the candidate parameter list is examined to determine whether it is empty. If the list of candidate communication parameters is determined to be empty at 220, then at 290, a process failure or error is declared, and the process ends at 295. The error may generate a system notification or other interrupt that may be logged or brought to the immediate attention of the network operator for corrective action.

For as long as the candidate parameter list is not empty and a parameter has not been selected, an iterative process begins in which the entries in the candidate communication parameter list are ranked using ranking sub-process 300 to generate a ranked candidate parameter list, or simply a ranked list. After the list is ranked, then operations are 230-290 are performed, as shown in FIG. 2, Turning to FIG. 3, the ranking sub-process 300 is now described. At 310, the ranked candidate list is initialized using a candidate in the candidate list and the corresponding candidate is removed from the candidate list. Operation 320 is a loop control point for the loop consisting of operations 340-360 that is executed until the candidate list is empty. At 320, if the candidate list is empty, at 330, the first or highest ranked candidate is designated as a default entry. While the candidate list is not empty, at 340 an entry in the candidate list is selected. At 350, the selected entry is added or inserted into the ranked candidate list in rank order, for example, at the end of the ranked list. The ranking of the candidate communication parameter may be made based on an identifier of the particular RAP using a predetermined computation, e.g., a hash computation. At 360, the selected entry is removed from the candidate list. At the completion of the ranking sub-process 300, a ranked list of candidate parameters is obtained, the ranking having been made based on a characteristic of the particular RAP.

Referring back to FIG. 2, the loop consisting of operations 230-250 is performed to remove from the ranked list of candidate communication parameters, a communication parameter that would be selected by a neighboring RAP. To this end, a prediction is made as to which communication parameter from the ranked list would be selected by each neighboring RAP. At 230, it is determined whether or not the loop 230-250 has been processed for all the neighboring RAPs (based on the list of neighboring RAPs determined at 205). When all the neighboring RAPs have not been processed, at 235, the next neighboring RAP is selected for processing. At 240, it is determined whether or not the selected neighboring RAP should be ignored. For example, RAPs with higher (or lower) value EIDs may be given priority (for purposes of selection of a communication parameter) over RAPs with lower (or higher) value EIDs. RAPs with lower priority EIDs can thus be ignored, i.e., not processed, meaning that a communication parameter that would be selected by a lower priority RAP will not be removed from the list of candidate parameters, making that communication parameter available for selection and use by the particular RAP for which the process 200 is being performed. Thus, at 240, a comparison may be made between the ID for the particular RAP and the ID for the neighbor RAP under consideration, or the order/rank of the neighbor RAP in the list of neighbor RAPs is evaluated to determine whether or not to ignore the neighbor RAP. For a RAP with a higher priority ID, at 245, a prediction is made as to which entry in the ranked candidate list would be chosen by the neighboring RAP. The prediction function used at 245 is based on the same predetermined computation that is used by all RAPs to ultimately choose a ranked candidate (as in operation 350 in FIG. 3). Alternatively, at 245, a process may be performed that similar to the entirety of process 200, but for a neighbor RAP using a list of neighbor RAPs for that neighbor RAP. At 250, the selected neighboring RAP's predicted entry is removed from the ranked candidate list, thereby avoiding a similar selection by the particular RAP. By removing a set of communication parameters that are predicted to have been selected by neighboring RAPs from the set of candidate communication parameters (i.e., a so-called predicted set of candidate communication parameters) that are used as a starting point, it is determined which communication parameters in the set of candidate communication parameters are available for use by the particular RAP.

Once all of the neighboring RAPs have been processed as determined at 230, the process continues to 255. At 255, a determination is made as to whether the ranked candidate list is empty. The ranked candidate list may be empty if, for some reason, it is predicted that all higher priority neighboring RAPs would have selected all the parameters in the ranked candidate list. If the ranked candidate list is empty, then at 260, the default entry (set at 330 in FIG. 3) is selected. If the ranked candidate list is not empty, then at 270, the first entry in the ranked candidate list is selected. At this point, the process may continue at 285 and the parameter in the selected entry from the ranked candidate list is deployed for use, e.g., by the particular RAP for which the process 200 is being executed. Optionally, and for a more robust parameter selection, at 275 a determination is made as to whether the selected parameter is already in use. In order to determine whether a parameter is already in use, a REM scan may be employed to scan the RF environment to detect signals from other devices, e.g., other RAPs. Parameters that are determined to already be in use can be extracted from received signals during the REM scan. Alternatively, the wireline network can be used, for example, to allow RAP-to-RAP communication for exchange of information about parameters already in use. RAP-to-RAP communication may be performed using a network discovery protocol or other mechanism such as Extensible Messaging and Presence Protocol (XMPP). For example, if XMPP publish-subscribe techniques are used, then every RAP can publish its current parameter selection based on its ID. The particular RAP that is making a selection can subscribe to updates from its neighboring RAPs, and thus be made aware of the parameters that its neighboring RAPs have selected. If the selected parameter is in use, at 280, that parameter and all other entries in the candidate list that are in use parameters are removed from the ranked list and the process returns to 220. Eventually, through the processing described in connection with FIGS. 2 and 3, a communication parameter will be selected for the particular RAP. The process 200 may be performed for any and all RAPs in a deployment.

Reference is now made to FIGS. 4 and 5 for a description of the PSC selection process 400. The PSC selection process 400 follows a flow that is similar to that of parameter selection process 200, but is specific to PSC selection. The PSC selection process 400 may be performed all or in part by a RAP, e.g., RAPs 40(1)-40(5), base station 20, management server 60, or some other LAN or WAN attached device. The process 400 starts at 405 where a list of neighbor RAPs and the EIDs of each neighbor RAP is determined for a particular RAP for which a PSC is to be selected. The list of neighbors RAPs may be determined as described in connection with FIG. 2, and may be provisioned to a particular RAP if the process 400 is performed by the particular RAP.

At 410, a list of candidate PSCs is determined for the particular RAP. The PSC candidate list contains a list of PSCs from which the particular RAP may select for use in its cell. At 420, the candidate PSC list is examined to determine whether the candidate PSC list is empty. If the candidate PSC list is empty, a process failure or error is declared at 490, and the process ends at 495. The error may generate a system notification or other interrupt that may be logged or brought to the immediate attention of the network administrator for corrective action.

For as long as the candidate PSC list is not empty and a PSC has not been selected for the particular RAP, an iterative process begins in which the entries in the candidate PSC list are ranked using ranking sub-process 500 to generate a ranked candidate PSC list, or simply a ranked PSC list. After the candidate PSC list is ranked, operations 430-450 are performed, as shown in FIG. 4.

Turning to FIG. 5, the ranking sub-process 500 is now described. The sub-process 500 starts at 510 where the ranked PSC list is initialized using a candidate in the candidate PSC list and the corresponding candidate is removed from the candidate PSC list. Like the sub-process 300 shown in FIG. 3, operation 520 is a loop control point for the loop consisting of operations 540-560 that is executed until the candidate PSC list is empty. At 520, if the candidate PSC list is empty, at 530, the first or highest ranked candidate is designated as a default ranked PSC and the process ends at 570. While the candidate PSC list is not empty, at 540 an entry in the PSC candidate list is selected.

In order to select a PSC from the PSC candidate list, a selection function is used. In this example, a one-time Jenkins hash is used on the EID of the particular RAP for which a PSC is being selected. The EID hash value is subject to a modulus or modulo operation using the number of current entries in the candidate PSC list. The modulo remainder thereby becomes an index into the candidate PSC list to select an entry from the candidate PSC list. At 550, the selected PSC is added to the end of the ranked PSC list. At 560, the selected PSC is removed from the candidate PSC list. This loop repeats until the candidate PSC list is empty, and the output or result of the ranking sub-process 500 is a ranked list of PSCs, where the ranking is determined based on a unique ID of the particular RAP.

Thus, to summarize the operations of FIG. 5, the ranked PSC list (or more general, the ranked communication parameter list) is generated by hashing the unique ID for the particular RAP to generate a first hashed result; performing a modulus operation on the first hashed result using a number of entries in the set of candidate communication parameters to create a first index; selecting an entry from the set of candidate communication parameters based on the first index; adding the selected entry from the set of candidate communication parameters to an end of the ranked list of communication parameters; removing the selected entry from the set of candidate wireless communication parameters; and repeating the hashing, performing the modulus operation, selecting, adding and removing until no entries remain in the set of candidate communication parameters.

Referring back to FIG. 4, processing returns using the ranked PSC list at 430. Operation 430 is a loop control point for a loop consisting of operations 430-450 that is executed to remove from the ranked PSC list a PSC that would be selected by a neighboring RAP. Within this loop of operations, a prediction is made of a PSC from the ranked list that would be selected by each RAP in the list of neighbor RAPs for the particular RAP. Thus, the operations of this loop are performed for each neighbor RAP in the list of neighbor RAPs determined at operation 405.

At 430, it is determined whether or not the operations of the loop 430-450 has been performed for each RAP in the list of each neighbor RAPs. At 435, the next neighboring RAP is selected for processing. At 440, it is determined whether or not the selected neighboring RAP should be ignored, and this operation is similar to operation 240 described above in connection with FIG. 2 in order to protect a PSC selection that would be made by a higher priority neighbor RAP. For those higher priority neighbor RAPs whose PSC selection should be protected, at 445, a Jenkins hash computation is run on the neighbor RAP EID and a modulo operation is performed on that number based on the size of the ranked PSC list, and the result is used as an as index into the ranked PSC list to predict a PSC that would be selected by this neighbor RAP. The prediction operation at 445 is based on the same computation used by all RAPs to ultimately select a ranked candidate, as in operation 550 in FIG. 5. Alternatively, at 445, the entire process 400 can be executed for a neighbor RAP using a list of neighbor RAPs for that neighbor RAP. At 450, the PSC that is predicted to be selected by the neighbor RAP is removed from the ranked PSC list, thereby avoiding a similar selection for the particular RAP. That is, the prediction at 445 could be run more deeply in that the entire algorithm is run for the neighbor as if the neighbor RAP was the RAP selecting a parameter, and the neighbor RAP removes from its ranked list what it predicts its neighbor RAPs would select, then that predicted entry is removed from the ranked list of parameters that this particular RAP could select. This is referred to as multi-level predictive selection.

In summary, 430-450 involve determining, for each neighboring RAP in the list of neighboring RAPs, a communication parameter that would be selected by the neighboring RAP based on the same predetermined computation used by the particular RAP, and removing from the ranked list the communication parameter that would be selected by the neighboring RAP. The determination of the communication parameter that would be selected by the neighboring RAP involves hashing the unique identifier for the neighboring RAP to generate a second hashed result; performing a modulus operation on the second hashed result using a number of entries in the set of candidate communication parameters to create a second index; selecting an entry from the set of candidate communication parameters based on the second index; adding the selected entry from the set of candidate communication parameters to an end of the ranked list of communication parameters; removing the selected entry from the set of candidate communication parameters; and repeating the hashing of the unique identifier unique for the neighboring radio access point, performing the modulus operation on the second hashed result, selecting an entry from the set of candidate communication parameters, adding the selected entry from the set of candidate communication parameters and removing the selected entry from the set of candidate communication parameters until no more entries remain in the set of candidate communication parameters.

When it is determined at 430 that the loop 430-450 has been performed for all neighbor RAPs in the list of neighbor RAPs for the particular RAP, process 400 proceeds to 455. At 455, a determination is made as to whether the ranked PSC list is empty. If the ranked PSC list is empty, at 460, the default PSC is selected. If the ranked PSC candidate list is not empty, then at 470, the first entry in the ranked PSC list is selected. The process may continue to 485 and the selected PSC is deployed for use by the particular RAP. However, at 475 a determination may be made as to whether the selected PSC is already in use by a neighboring RAP. The processing described above for operations 275 and 280 may be performed at 475 and 480 to remove from the ranked PSC list any PSCs determined to already be in use A PSC would ultimately be selected, if one is still available in the ranked PSC list, for the particular RAP.

The following examples are provided for PSC selection for 3 RAPs in a cluster and a set of 6 PSCs from which a PSC may be selected. The candidate PSC list includes psc-a, psc-b, psc-c, psc-d, psc-e, psc-f. The RAP EIDs include: rap-eid-1, rap-eid-2, rap-eid-3 (and the EIDs in this list are ordered from smallest to largest in value).

Process 400 is executed for rap-eid-1 for three iterations (e.g., one iteration per RAP EID), the ranked PSC list that would be obtained at each iteration is:
1) Initial ranked PSC list: psc-f, psc-e, psc-b, psc-d, psc-c, psc-a.
2) Ranked PSC list after processing rap-eid-2: psc-e, psc-b, psc-d, psc-c, psc-a.
3) Ranked PSC list after processing rap-eid-3: psc-e, psc-b, psc-d, psc-a.
The PSC at the top of the ranked PSC list, psc-e, is selected for use by RAP with rap-eid-1.

The process 400 may then be executed for rap-eid-2 for three iterations and the ranked PSC list that would be obtained at each iteration is:
1) Initial ranked PSC list: psc-f, psc-d, psc-b, psc-e, psc-c, psc-a.
2) Ranked PSC list after processing rap-eid-1: psc-f, psc-d, psc-b, psc-e, psc-c, psc-a. (note that the value of rap-eid-1 is lower than rap-eid-2, and thus, ignored during execution of the process 400).
3) Ranked PSC list after processing rap-eid-3: psc-f, psc-d, psc-b, psc-e, psc-a.
The PSC at the top of the list, psc-f, is selected for use by RAP with rap-eid-2.

The process 400 may then be executed for rap-eid-3 for three iterations and the ranked PSC list that would be obtained at each iteration:
1) Initial ranked PSC list: psc-c psc-a psc-b psc-f psc-d psc-e.
2) Ranked PSC list after processing rap-eid-1: psc-c psc-a psc-b psc-f psc-d psc-e (note that the value of rap-eid-1 is lower than the value of rap-eid-3, and thus, ignored).
3) Ranked PSC list after processing rap-eid-2: psc-c psc-a psc-b psc-f psc-d psc-e (note that the value of rap-eid-2 is lower than the value of rap-eid-3, and thus, ignored).
The PSC at the top of the ranked PSC list, psc-c, is selected for use by RAP with rap-eid-3.

As can be seen from the example above, using the techniques presented herein, a unique communication parameter can be selected for each RAP with a relatively high probability of no conflict.

The parameter selection techniques described herein are superior to existing techniques because they drastically reduce conflicts with hidden neighbors when compared with a randomization function or even a basic hashing function. This is due to the fact that the selection process uses a list of in-range neighbor RAPs (determined through various means described herein) to better predict the parameters that would be selected by each neighboring RAP, thus allowing the RAP under consideration to make a better selection and thereby avoid a conflict. This process still allows the selection to be performed autonomously by RAPs, avoiding the need to rely on the management for activation of every RAP in a deployment. The distributed nature of the selection techniques presented herein ensures that after hidden neighbors select a parameter, their selected parameters do not need to be communicated to all of their neighbors. The use of a predetermined selection function by all RAPs, e.g., the hash-mod-based selection function described herein, allows for distributed convergence. In analysis from a model on a large deployment, the parameter selection techniques presented herein would reduce the number of conflicts (and interfering RAPs) from by as much as 8% compared to existing randomized parameter selection techniques. This would have significant impact on the number of dropped calls, failed handover and quality of service issues.

Reference is now made to FIG. 6. FIG. 6 shows an example of a block diagram for a RAP, e.g., one of RAPs shown in FIG. 1 and generically identified by reference numeral 40(i), configured to perform the parameter selection techniques described herein. The RAP comprises a wireless radio transceiver 610, processor 620, memory 630, and network interface unit 640. The memory 640 stores software instructions for RAP parameter selection process logic 650. The RAP parameter selection process logic 650 includes instructions to perform the process 200 depicted by FIGS. 2 and 3 or 400 depicted by FIGS. 4 and 5. The processor 620 may be a microprocessor or microcontroller that executes the instructions of RAP parameter selection process logic 650 to carry out the functions described above. The network interface unit 640 is, for example, a network interface card that facilitates network communication with the management server 60 and with other RAPs.

The wireless network transceiver module 610 comprises an RF transmit and receive section and a baseband signal processing or modem section for baseband signal processing. One of the functions of the baseband signal processing section of the module 610 is to measure the strength of received signals, e.g., strength of beacon signals received from another RAP or from a macro base station, and to produce receive signal strength information (RSSI) data representative thereof, and to detect the use of a parameter by another RAP from a radio environment measurement scan. The baseband signal processing section also extracts the PSC for a received beacon signal.

FIG. 7 shows a block diagram for a management station, e.g., management server 60 configured to perform the parameter selection techniques presented herein. The management server 60 comprises a display 710, a processor 720, memory 730, a network interface unit 740, a bus 745 and a keyboard 750. The keyboard 750 and display 710 allow a user or system operator to monitor and configure the various components in network 10. The memory 740 stores software instructions for management station parameter selection process logic 760. The management station parameter selection process logic 760 comprises instructions to enable the management server 60 to perform some or all of the operations of the process 200 or 400 described herein. The processor 720 executes the instructions of management station parameter selection process logic 760 to select a parameter on behalf of a RAP as described above in connection with FIGS. 2 and 3, and FIGS. 4 and 5. The network interface unit 740 facilitates network communication between the management server 60 and the RAPs in a network in order to provision a RAP with a list of neighbors and list of candidate communication parameters to enable that RAP to run the parameter selection techniques described herein to select a parameter, or to send to a RAP a message containing a communication parameter selected by the management server 60 by performing the parameter selection techniques described herein on behalf of a RAP.

The memory 630 in FIG. 6 and memory 730 in FIG. 7 may comprise read only memory (ROM), random access memory (RAM), magnetic disk storage media devices, optical storage media devices, flash memory devices, electrical, optical, or other physical/tangible memory storage devices. Thus, in general, the memory 630 and 730 may comprise one or more tangible computer readable storage media (e.g., a memory device) encoded with software comprising computer executable instructions and when the software is executed (by a processor) it is operable to perform the operations described herein In summary, techniques are presented herein to select a communication parameter for use by a radio access point in a wireless network. A list is obtained of neighboring radio access points with respect to a particular radio access point in a wireless network. The list includes a unique identifier for each neighboring radio access point. A set of candidate communications parameters is obtained for use in the wireless network by the particular radio access point. A prediction is made of the candidate communications parameters in the set of candidate communications parameters that may be used by the neighboring radio access points to generate a predicted set of communications parameters. The communication parameters in the set of candidate communication parameters which are available for use by the particular access point are determined based on the predicted set of communications parameters. A communication parameter is selected for use by the particular radio access point based on the communication parameters determined to be available for use.

The above description is intended by way of example only.

What is claimed is:

1. A method comprising:
obtaining a list of neighboring radio access points with respect to a particular radio access point in a wireless network, the list including a unique identifier for each neighboring radio access point;
obtaining a set of candidate communications parameters for use in the wireless network by the particular radio access point;
from the set of candidate communication parameters, predicting candidate communications parameters which may be used by the neighboring radio access points to generate a predicted set of communications parameters;
determining which communication parameters in the set of candidate communication parameters are available for use by the particular access point based on the predicted set of communications parameters; and
selecting a communication parameter for use by the particular radio access point based on communication parameters determined to be available for use.

2. The method of claim 1, wherein determining comprises removing the predicted set of communication parameters from the set of candidate communication parameters.

3. The method of claim 1, further comprising:
generating a ranked list of communication parameters from the set of candidate communication parameters using a predetermined computation that is based on a unique identifier for the particular radio access point.

4. The method of claim 3, wherein generating the ranked list includes:
hashing the unique identifier for the particular radio access point to generate a first hashed result;
performing a modulus operation on the first hashed result using a number of entries in the set of candidate communication parameters to create a first index;
selecting an entry from the set of candidate communication parameters based on the first index;
adding the selected entry from the set of candidate communication parameters to an end of the ranked list of communication parameters;
removing the selected entry from the set of candidate wireless communication parameters; and
repeating the hashing, performing the modulus operation, selecting, adding and removing until no entries remain in the set of candidate communication parameters.

5. The method of claim 3, wherein predicting comprises, for each neighboring radio access point in the list of neighboring radio access points:
determining a communication parameter that would be selected by the neighboring radio access point based on the predetermined computation; and
removing from the ranked list the communication parameter that would be selected by the neighboring radio access point.

6. The method of claim 5, further comprising determining whether to ignore a neighboring radio access point in the list of neighboring radio access points such that the communication parameter that would be selected by that neighboring radio access point is not available for selection for use for the particular radio access point.

7. The method of claim 6, wherein determining whether to ignore a neighboring radio access point in the list of neighboring radio access point is based on a unique identifier of the particular radio access point relative to a unique identifier of the neighboring radio access point or based on an order of neighboring radio access points in the list of neighboring radio access points.

8. The method of claim 5, wherein determining a communication parameter that would be selected by a neighboring radio access point comprises:
hashing the unique identifier for the neighboring radio access point to generate a second hashed result;
performing a modulus operation on the second hashed result using a number of entries in the set of candidate communication parameters to create a second index;
selecting an entry from the set of candidate communication parameters based on the second index;
adding the selected entry from the set of candidate communication parameters to an end of the ranked list of communication parameters;
removing the selected entry from the set of candidate communication parameters; and
repeating the hashing of the unique identifier unique for the neighboring radio access point, performing the modulus operation on the second hashed result, selecting an entry from the set of candidate communication parameters, adding the selected entry from the set of candidate communication parameters and removing the selected entry from the set of candidate communication parameters until no more entries remain in the set of candidate communication parameters.

9. The method of claim 5, wherein determining a communication parameter that would be selected by a neighboring radio access point comprises, for each neighboring radio access point, predicting the candidate communication parameter in the set of candidate communication parameters that may be used by each its neighboring radio access points.

10. The method of claim 5, further comprising:
selecting a first entry remaining in the ranked list of communication parameters;
determining whether the first entry in the ranked list of communication parameters is already in use by a neighboring radio access point;
selecting for use by the particular radio access point the first entry if it is determined that it is not already in use by a neighboring radio access point;
if it is determined that the first entry is already in use, repeating the determining whether it is in use and selecting for use operations for subsequent remaining entries in the ranked list of communication parameters until an entry in the list is selected or it is determined that there are no more entries in the ranked list of candidate communication parameters.

11. The method of claim 10, wherein determining whether an entry in the ranked list of communication parameters is already in use by a neighboring radio access points is based on one or more of: received signals in a frequency band to determine that a communication parameter is already in use by a neighboring radio access point; and communications received from one or more neighboring radio access points indicating a communication parameter is used by another neighboring radio access point.

12. The method of claim 1, wherein the set of candidate communication parameters comprising one or more of: a set of Primary Scrambling Codes, a set of Physical Channel Identifiers, a set of Universal Mobile Telecommunications System (UMTS) Terrestrial Radio Access (UTRA) Absolute Radio Frequency Channel Numbers, a set of Long Term Evolution (e) eUARFCNs, a set of Absolute Radio Frequency Channel Numbers, a set of Location Area Codes, and a set of Routing Area Codes.

13. The method of claim 1, wherein obtaining the list of neighboring radio access points comprises generating the list of neighboring radio access points at a management device based on geolocation data of radio access points operating in the wireless network, further comprising receiving at the particular radio access point the list of neighboring radio access points and the set of candidate communication parameters from the management device, and wherein predicting, determining and selecting are performed by the particular radio access point.

14. The method of claim 1, wherein obtaining the list of neighboring radio access points, obtaining the set of candidate communication parameters, predicting and determining are performed at a management device to select a communication parameter for use by the particular radio access point, and further comprising sending to the particular radio access point a message that includes the selected communication parameter for the particular radio access point.

15. An apparatus comprising:
a network interface unit configured to enable network communications; and
a processor configured to couple to the network interface unit, wherein the processor is configured to:
obtain a list of neighboring radio access points with respect to a particular radio access point in a wireless network, the list including a unique identifier for each neighboring radio access point;

obtain a set of candidate communications parameters for use in the wireless network by the particular radio access point;

from the set of candidate communication parameters, predict candidate communications parameters which may be used by the neighboring radio access points to generate a predicted set of communications parameters;

determine which communication parameters in the set of candidate communication parameters are available for use by the particular access point based on the predicted set of communications parameters; and select a communication parameter for use by the particular radio access point based on communication parameters determined to be available for use.

16. The apparatus of claim 15, wherein the processor is configured to remove the predicted set of communication parameters from the set of candidate communication parameters.

17. The apparatus of claim 15, wherein the processor is further configured to generate a ranked list of communication parameters from the set of candidate communication parameters using a predetermined computation that is based on a unique identifier for the particular radio access point.

18. The apparatus of claim 17, wherein to generate the ranked list, the processor is configured to:

hash the unique identifier for the particular radio access point to generate a first hashed result;

perform a modulus operation on the first hashed result using a number of entries in the set of candidate communication parameters to create a first index;

select an entry from the set of candidate communication parameters based on the first index;

add the selected entry from the set of candidate communication parameters to an end of the ranked list of communication parameters;

remove the selected entry from the set of candidate communication parameters; and repeat the hash, perform the modulus operation, select, add and remove operations until no entries remain in the set of candidate communication parameters.

19. The apparatus of claim 17, wherein to generate the predicted set of candidate communication parameters, the processor is configured, for each neighboring access point, to:

determine a communication parameter that would be selected by the neighboring radio access point based on the predetermined computation; and remove from the ranked list the communication parameter that would be selected by the neighboring radio access point.

20. The apparatus of claim 15, wherein the network interface unit is configured to receive at the particular radio access point the list of neighboring radio access points, and wherein the processor is configured to predict, determine and select at the particular radio access point.

21. The apparatus of claim 19, wherein to determine a communication parameter that would be selected by a neighboring radio access point, the processor is configured to, for each neighboring radio access point, predicting the candidate communication parameter in the set of candidate communication parameters that may be used by each its neighboring radio access points.

22. The apparatus of claim 19, wherein the processor is further configured to:

select a first entry remaining in the ranked list of communication parameters;

determine whether the first entry in the ranked list of communication parameters is already in use by a neighboring radio access point;

select for use by the particular radio access point the first entry if it is determined that it is not already in use by a neighboring radio access point;

if it is determined that the first entry is already in use, repeat the operation to determine whether it is in use and selecting for use operations for subsequent remaining entries in the ranked list of communication parameters until an entry in the list is selected or it is determined that there are no more entries in the ranked list of candidate communication parameters.

23. The apparatus of claim 22, wherein the processor determines whether an entry in the ranked list of communication parameters is already in use by a neighboring radio access points based on one or more of: received signals in a frequency band to determine that a communication parameter is already in use by a neighboring radio access point; and communications received from one or more neighboring radio access points indicating a communication parameter is used by another neighboring radio access point.

24. One or more non-transitory computer readable storage media encoded with software comprising computer executable instructions and when the software is executed operable to:

obtain a list of neighboring radio access points with respect to a particular radio access point in a wireless network, the list including a unique identifier for each neighboring radio access point;

obtain a set of candidate communications parameters for use in the wireless network by the particular radio access point;

from the set of candidate communication parameters, predict candidate communications parameters which may be used by the neighboring radio access points to generate a predicted set of communications parameters;

determine which communication parameters in the set of candidate communication parameters are available for use by the particular access point based on the predicted set of communications parameters; and select a communication parameter for use by the particular radio access point based on communication parameters determined to be available for use.

25. The non-transitory computer readable storage media of claim 24, further comprising instructions operable to remove the predicted set of communication parameters from the set of candidate communication parameters.

26. The non-transitory computer readable storage media of claim 24, and further comprising instructions operable to generate a ranked list of communication parameters from the set of candidate communication parameters using a predetermined computation that is based on a unique identifier for the particular radio access point.

27. The non-transitory computer readable storage media of claim 26, wherein the instructions operable to generate the ranked list of communication parameters comprise instructions operable to:

hash the unique identifier for the particular radio access point to generate a first hashed result;

perform a modulus operation on the first hashed result using a number of entries in the set of candidate communication parameters to create a first index;

select an entry from the set of candidate communication parameters based on the first index;

add the selected entry from the set of candidate communication parameters to an end of the ranked list of communication parameters;

remove the selected entry from the set of candidate communication parameters; and repeat the hash, perform the modulus operation, select, add and remove operations until no entries remain in the set of candidate communication parameters.

28. The non-transitory computer readable storage media of claim 26, wherein the instructions operable to generate the predicted set of candidate communication parameters comprise instructions operable to:

determine a communication parameter that would be selected by the neighboring radio access point based on the predetermined computation; and remove from the ranked list the communication parameter that would be selected by the neighboring radio access point.

29. The non-transitory computer readable storage media of claim 28, wherein the instructions operable to determine a communication parameter that would be selected by a neighboring radio access point comprise instructions operable to:

hash the unique identifier for the neighboring radio access point to generate a second hashed result;

perform a modulus operation on the second hashed result using a number of entries in the set of candidate communication parameters to create a second index;

select an entry from the set of candidate communication parameters based on the second index;

add the selected entry from the set of candidate communication parameters to an end of the ranked list of communication parameters;

remove the selected entry from the set of candidate communication parameters; and repeat the hash of the unique identifier unique for the neighboring radio access point, perform the modulus operation on the second hashed result, select an entry from the set of candidate communication parameters, add the selected entry from the set of candidate communication parameters and remove the selected entry from the set of candidate communication parameters until no more entries remain in the set of candidate communication parameters.

30. The non-transitory computer readable storage media of claim 28, wherein the instructions operable to determine a communication parameter that would be selected by a neighboring radio access point comprises instructions operable to, for each neighboring radio access point, predict the candidate communication parameter in the set of candidate communication parameters that may be used by each its neighboring radio access points.

31. The non-transitory computer readable storage media of claim 28, further comprising instructions operable to:

select a first entry remaining in the ranked list of communication parameters;

determine whether the first entry in the ranked list of communication parameters is already in use by a neighboring radio access point;

select for use by the particular radio access point the first entry if it is determined that it is not already in use by a neighboring radio access point;

if it is determined that the first entry is already in use, repeat the operation to determine whether it is in use and select for use operations for subsequent remaining entries in the ranked list of communication parameters until an entry in the list is selected or it is determined that there are no more entries in the ranked list of candidate communication parameters.

32. The non-transitory computer readable storage media of claim 31, wherein the instructions operable to determine whether an entry in the ranked list of communication parameters is already in use by a neighboring radio access points are based on one or more of: received signals in a frequency band to determine that a communication parameter is already in use by a neighboring radio access point; and communications received from one or more neighboring radio access points indicating a communication parameter is used by another neighboring radio access point.

33. The apparatus of claim 19, wherein to determine a communication parameter that would be selected by a neighboring radio access point, the processor is configured to:

hash the unique identifier for the neighboring radio access point to generate a second hashed result;

perform a modulus operation on the second hashed result using a number of entries in the set of candidate communication parameters to create a second index;

select an entry from the set of candidate communication parameters based on the second index;

add the selected entry from the set of candidate communication parameters to an end of the ranked list of communication parameters;

remove the selected entry from the set of candidate communication parameters; and repeat the hash of the unique identifier unique for the neighboring radio access point, perform the modulus operation on the second hashed result, select an entry from the set of candidate communication parameters, add the selected entry from the set of candidate communication parameters and remove the selected entry from the set of candidate communication parameters until no more entries remain in the set of candidate communication parameters.

* * * * *